Dec. 20, 1949 E. G. STURGEON ET AL 2,491,626
CUTTING TOOL
Filed Feb. 5, 1948

INVENTORS.
Leon N. Butler.
Franz Von Valtier.
Lee Wiedenbeck.
Edward G. Sturgeon.
BY
Harness, Dickey & Pierce
ATTORNEYS.

Patented Dec. 20, 1949

2,491,626

UNITED STATES PATENT OFFICE 2,491,626

CUTTING TOOL

Edward G. Sturgeon, Pontiac, Franz von Valtier, Detroit, Lee Wiedenbeck, Berkley, and Leon N. Butler, Detroit, Mich., assignors, by mesne assignments, to Eclipse Counterbore Company, a corporation of Michigan Application February 5, 1948, Serial No. 6,438

6 Claims. (Cl. 279—93)

This invention relates broadly to new and useful improvements in couplings and more particularly to a device of this character which is primarily adapted though not limited for use in cutting tools.

A typical use for the coupling is to fasten a cutter in a holder; and, when used in this capacity, the coupling establishes a positive nonchattering drive between the parts. Since the coupling is primarily intended for this purpose it is so shown and described by way of illustration in this application. But it is to be understood that in its broader aspects, the coupling can be applied to any revolving driving mechanism such as line shafting or arbors in milling machines.

An important object of the invention is to provide a coupling which permits a driven element to be easily and quickly fastened to or disengaged from the driving member.

Still another object of the present invention is to provide a coupling of the above-mentioned character wherein the driven element has a tapered shank which fits in a correspondingly tapered socket in the driving member and includes novel means for maintaining the shank pressed solidly against the wall of the socket at all times.

Still another object of the invention is to provide a coupling of the above-mentioned character which is uniquely constructed so that it will not be released inadvertently in operation.

Yet another object of the invention is to provide a coupling of the above-mentioned character wherein the driving member interengages with the driven element to provide a positive rotary drive therebetween.

Other objects and advantages of the invention will be apparent during the course of the following description.

In the drawing forming a part of this specification and wherein like numerals are employed to designate like parts throughout the same, Figure 1 is a side elevational view of a cutting tool in which the holder and cutter are detachably fastened together by a coupling embodying the invention;

Figure 1:
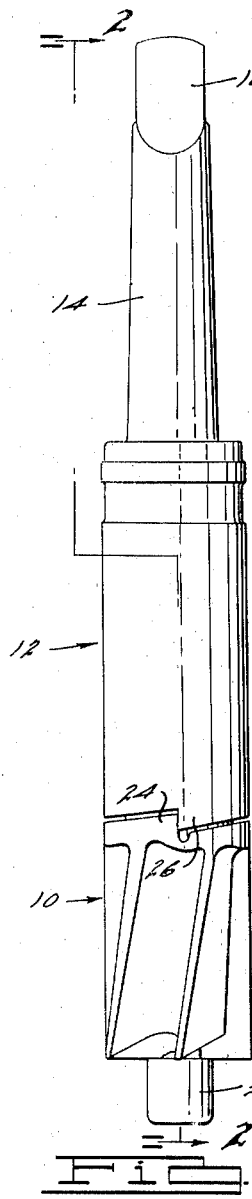

Broadly, the cutting tool here shown comprises a cutter 10 and a holder 12 for the cutter. The cutter 10 is disposed below and in coaxial relation with the holder 12. Usually both the cutter 10 and the holder 12 will be generally cylindrical in shape as shown in the drawing. At its upper end the holder 12 is provided with a tapered shank 14 which terminates in the usual tang 16. Both the shank 14 and the tang 16 are conventional in devices of this character and their purpose is to fit in and connect the holder to the driving spindle of a boring machine or drill press (not shown). The cutter 10 here shown by way of illustration is a counterbore, but it will be readily appreciated that the present invention can be adapted to any type of cutting tool. This invention is concerned primarily with means for fastening the cutter 10 to the holder 12.

To this end, the cutter 10 is provided at the upper end thereof with a longitudinally tapered shank 18 which extends into and snugly fits a correspondingly tapered socket 20 in the lower end of holder 12. Any suitable taper may be provided for the shank 18, but the taper angle preferably is sufficiently great so as to be nonsticking. It will be observed that the base of the shank 18 is of lesser diameter than the main body of the cutter to define an annular radial shoulder 22, and the shank projects slightly from the holder 12 to position the shoulder in slight spaced relation with respect to the confronting lower end of the holder. As a result, axial thrust against the cutter 10 forces the shank 18 solidly against the wall of socket 20, and the shank sustains the full thrust imposed on the cutter. However, in order to transmit rotary drive or torque from the holder to the cutter, the shoulder 22 is fashioned to provide one or more upwardly extending lugs 24 and the lower end of the holder 12 is formed with a corresponding number of downwardly projecting lugs 26. In the form of the invention here shown by way of illustration, the cutter 10 is formed with two lugs 24 as diametrically opposed sides thereof and the holder 12 is formed with two correspondingly located lugs 26. When the cutter 10 is interengaged with the holder 12, the lugs 26 abut against the lugs 24 to establish a positive rotary drive therebetween. Thus, the lugs 26 push against the lugs 24 to transmit driving torque from the holder to the cutter.

In cutting tools of this type, there is a tendency for the cutter 10 to chatter in the holder 12 when the device is in use even though pressure is imposed continuously axially thereagainst. Also, there is a tendency for the cutter to pull out of the holder inadvertently on occasion, as when the tool is withdrawn from the work. The problem is to provide a connection between the cutter 10 and the holder 12 which will be readily releasable and at the same time will hold the cutter in such manner as to prevent chattering or inadvertent disengagement.

Figure 6:
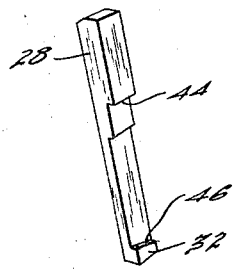
Fig. 6 is a perspective view of a clamping element embodying a part of the invention.

The connection here shown achieves all of the results set forth above and comprises a clamping member 28 mounted for longitudinal sliding movement in an axial groove or guideway 30 in the holder 12. The guideway 30 opens into and extends radially outwardly from the socket 20 to position the clamping member 28 laterally of the shank 18. Clamping member 28 is generally in the form of an elongated bar, as shown in Fig. 6, and the lower end thereof is formed with an inturned extension or lug 32 which projects into an annular groove 34 in shank 18. An axial slot 36 in the portion of shank 18 above annular groove 34 accommodates the lug 32 when the shank is inserted into the socket. According to the present invention, the tapered socket 20 terminates in an axial bore 38 and the guideway 30 extends the full length of the combined socket and bore. A spring retainer 40 is mounted in the bore 38 behind shank 18, and a spring 42 is supported in the bore by the retainer. In this connection, it will be observed that the clamping member 28 extends into the bore 38 beside retainer 40 and spring 42 and that it is formed with a shoulder 44 which seats downwardly against the upper end of spring 42. Thus, the spring 42 limits outward axial movement of the locking member 28; and, when compressed, it will urge the locking member axially into the holder 12.

Figure 2:
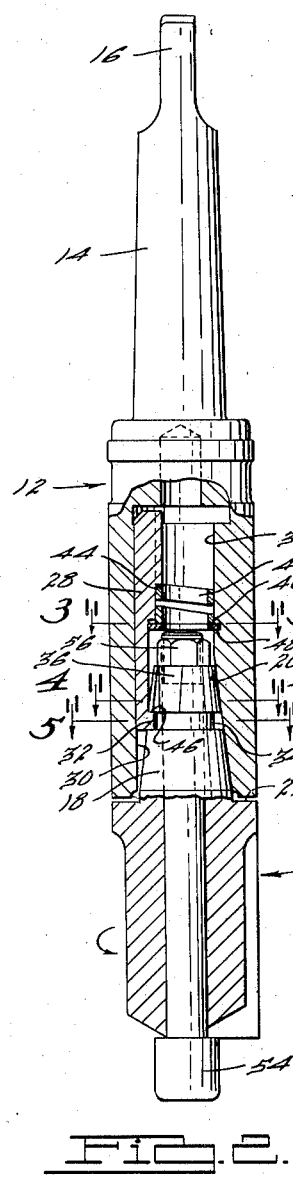
Fig. 2 is a view partly in section and partly in elevation taken generally on the line 2—2 of Figure 1.

According to the present invention, the lug 32 is formed with an inclined or beveled top surface 46 which is located so that the lower edge thereof just clears the upper radial wall of groove 34 when the shank 18 has been fully inserted in the socket 20. If the cutter 10 is then rotated in a clockwise direction, as shown by the arrow in Fig. 2, the upper radial edge of the groove 34 rides along the surface 46 and cams the clamping member 28 downwardly against the action of spring 42. The cutter 10 can be rotated in this manner until lugs 24 and 26 interengage as shown in Fig. 1 to prevent further rotation. Thereafter, the compressed spring 42 reacts through the clamping member 28 to maintain the shank 18 pressed solidly against the wall of socket 20.

From the foregoing, it will be readily apparent that the clamping member 28 and groove 34 collectively constitute a cam means which becomes operative upon rotation of shank 18 to compress the spring 42. As long as the spring 42 is under compression, there is a constant force holding the shank 18 against the wall of socket 20; and, in practice, this force is sufficient to prevent chattering of the cutter 10 during operation of the tool. Further, when the cutter 10 is rotated to compress spring 42, the lug 32 moves out of alignment with the axial groove 36 so that the lug is axially interlocked with the groove 34 to prevent the cutter from inadvertently disengaging the holder 12.

In this connection, it will be apparent that the cutter 10 can be disengaged from the holder 12 only by rotating the cutter in a counterclockwise direction until the axial groove 36 again moves into register with the lug 32. Manifestly, as the cutter is rotated in the above manner, spring 42 is progressively released; and, by the time the groove 36 moves into register with clamping member 28, the spring is no longer under compression. Cutter 10 can then be easily withdrawn from the holder 12.

Figure 3:
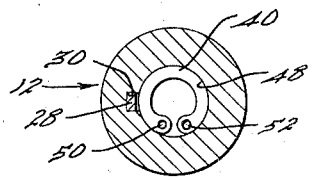
Fig. 3 is a transverse sectional view taken on the line 3—3 of Fig. 2.
Figure 4:
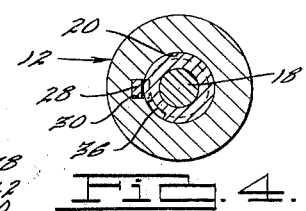
Fig. 4 is a transverse sectional view taken on the line 4—4 of Fig. 2.
Figure 5:
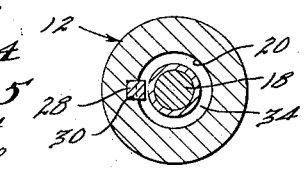
Fig. 5 is a transverse sectional view taken on the line 5—5 of Fig. 2.

While any type of conventional retainer may be used for spring 42, we prefer to employ a snap ring of the type shown in Fig. 3. This ring fits snugly in an annular groove 48 in the wall of bore 38 behind shank 18. The ends of the snap ring 40 are spaced as shown in Fig. 3, and the ring is compressed for assembly or disassembly by inserting the jaws of a conventional sharp-nosed pliers in holes 50 and 52 provided in the terminal portions of the ring. This arrangement permits the parts to be assembled or disassembled easily and quickly and at the same time holds the parts properly assembled in the holder.

Only one clamping member 28 is here shown but it will be readily apparent that two or more clamping members may be employed if necessary or desirable. In practice, we have found that one clamping member is sufficient for usual types and sizes of cutting tools; but any desired number may be used depending on the exigencies of the particular situation.

The cutter 10 here shown has the usual pilot pin 54 which extends axially therethrough and is secured by a nut 56 in the conventional manner.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention, we claim:

1. A coupling comprising a driving member having an inwardly tapered socket; a driven element having a correspondingly tapered shank disposed in the socket, said shank provided with a radial shoulder; a slidable clamping member beside said shank, said clamping member having a radial projection engaging under said shoulder; and resilient means behind said shank coactive with said clamping member to urge said radial extension against said shoulder and to force said shank solidly against the wall of the socket.

2. A coupling comprising a driving member having an inwardly tapered socket; a driven member having a correspondingly tapered shank disposed in the socket, said shank provided with a radial shoulder; a slidable clamping member in the socket beside said shank, said clamping member having a radial projection engaging under said shoulder and a radial seat behind said shank; and resilient means in the socket behind the shank acting against said radial seat to urge the clamping member axially into the socket and to force said radial extension against said shoulder whereby to maintain said shank pressed solidly against the wall of the socket.

3. A coupling comprising a driving member having an inwardly tapered socket provided with a longitudinal guideway; a driven element having a correspondingly tapered shank disposed in said socket, said shank provided with a radial shoulder; a clamping member longitudinally slidable in the guideway, said clamping member having a radial projection engaging under said shoulder and a spring seat behind said shank; and spring means in the socket behind the shank acting against said seat to urge the clamping member into the socket and to force said radial extension against said shoulder to maintain said shank pressed solidly against the wall of said socket.

4. The combination as set forth in claim 3 wherein said shank is formed with a longitudinal guideway which accommodates the radial projection on the clamping member when the shank is inserted into the socket, and wherein said radial projection comprises a cam element which coacts with said shoulder to move the clamping member axially against said spring means when the shank is rotated in the socket.

5. A coupling comprising a driving member having an inwardly tapered socket; a driven element having a correspondingly tapered shank disposed in said socket; spring means in the socket behind said shank; and retaining means having portions providing seats for said spring means and including cam means operable by rotation of the shank in said socket to compress said spring means, said spring means acting against said seats and through said cam means to maintain said shank pressed solidly against the wall of said socket.

6. A coupling comprising a driving member having an inwardly tapered socket; a driven element having a correspondingly tapered shank disposed in said socket; a removable spring retainer in the socket behind said shank; spring means in the socket behind said spring retainer; and cam means operable by rotation of the shank in the socket to compress said spring means against said retainer, and said spring means being reactive through said cam means to maintain the shank pressed solidly against the wall of the socket.

EDWARD G. STURGEON.
FRANZ von VALTIER.
LEE WIEDENBECK.
LEON N. BUTLER.

REFERENCES CITED

The following references are of record in the file of this patent:

UNITED STATES PATENTS

| Number | Name | Date |
|---|---|---|
| 1,766,136 | Markstrum | June 24, 1930 |
| 1,824,509 | Snader | Sept. 22, 1931 |
| 1,837,639 | Wickersham | Dec. 22, 1931 |
| 2,057,143 | Gairing | Oct. 13, 1936 |
| 2,059,496 | Smith | Nov. 3, 1936 |
| 2,118,485 | Brown | May 24, 1938 |